US012485639B2

(12) United States Patent
Marraccini

(10) Patent No.: US 12,485,639 B2
(45) Date of Patent: Dec. 2, 2025

(54) CORRUGATED CARDBOARD PRODUCTION PLANT WITH DOUBLE OUTPUT SIDE

(71) Applicant: Quantumcorrugated S.R.L., Milan (IT)

(72) Inventor: Marco Marraccini, Capannori (IT)

(73) Assignee: Quantumcorrugated S.R.L., Milan (IT)

( * ) Notice: Subject to any disclaimer, the term of this patent is extended or adjusted under 35 U.S.C. 154(b) by 22 days.

(21) Appl. No.: 18/070,110

(22) Filed: Nov. 28, 2022

(65) Prior Publication Data

US 2023/0173784 A1 Jun. 8, 2023

(30) Foreign Application Priority Data

Dec. 2, 2021 (IT) ........................ 102021000030563

(51) Int. Cl.
*B31F 1/28* (2006.01)

(52) U.S. Cl.
CPC .......... *B31F 1/2836* (2013.01); *B31F 1/2813* (2013.01)

(58) Field of Classification Search
CPC ........ B31F 1/2836; B31F 1/2813; B31F 1/28; B31F 1/26; B31F 1/2804
See application file for complete search history.

(56) References Cited

U.S. PATENT DOCUMENTS 2,008,974 A * 7/1935 Weber .................. B31F 1/2813 493/332
2,289,909 A * 7/1942 Greenwood .......... B31F 1/2813 156/472
3,293,107 A * 12/1966 Wells .................... B31F 1/2813 428/340
4,126,508 A * 11/1978 Hoelzinger ............... B32B 7/14 156/554
4,174,237 A * 11/1979 Hemming, Jr. ........ B65H 20/24 318/67
4,266,998 A * 5/1981 Tokuno ..................... B31F 5/00 172/205
4,500,381 A * 2/1985 Nordstrom ............ B31F 1/2813 156/207
4,871,406 A * 10/1989 Griffith .................. B32B 27/10 156/244.11
5,894,046 A * 4/1999 Kim .......................... B31F 1/28 428/184

(Continued)

FOREIGN PATENT DOCUMENTS

JP S5287477 U 6/1977
JP H0454836 U * 5/1992
WO 2014075748 A2 5/2014

*Primary Examiner* — Anna K Kinsaul
*Assistant Examiner* — Mobeen Ahmed
(74) *Attorney, Agent, or Firm* — Volpe Koenig

(57) ABSTRACT

A corrugated cardboard production plant with double output side includes a corrugation unit, configured to form a composite cardboard sheet, the corrugation unit includes a corrugator and a plurality of continuous paper web storing units, and a first processing station arranged downstream of the corrugation unit along a first direction of movement of the composite cardboard. The plant also includes a second processing station arranged downstream of the corrugation unit in sequence along a second direction of movement of the composite cardboard different from the first direction of movement.

18 Claims, 7 Drawing Sheets

(56) References Cited

U.S. PATENT DOCUMENTS

| | | | | | |
|---|---|---|---|---|---|
| 6,048,429 | A * | 4/2000 | Cummings | B31F 1/2813 156/472 |
| 6,153,037 | A * | 11/2000 | Kim | B31F 1/28 156/472 |
| 6,667,092 | B1 * | 12/2003 | Brollier | G06K 19/02 206/459.1 |
| 8,584,727 | B2 * | 11/2013 | Casey | B31F 1/2881 156/523 |
| 10,618,241 | B2 * | 4/2020 | Gnan | B31F 1/2836 |
| 11,241,859 | B2 * | 2/2022 | Brivio | B31F 1/2818 |
| 12,080,194 | B1 * | 9/2024 | Drummond | B31F 5/04 |
| 2004/0182503 | A1 * | 9/2004 | Stadele | B31F 1/2822 156/472 |
| 2005/0194088 | A1 * | 9/2005 | Kohler | B31F 1/2818 156/470 |
| 2005/0284579 | A1 * | 12/2005 | Ishibuchi | B31F 1/284 156/367 |
| 2008/0251211 | A1 * | 10/2008 | Akiyama | B31F 1/2813 156/472 |
| 2019/0001606 | A1 * | 1/2019 | Polster | B31F 5/008 |
| 2020/0009821 | A1 * | 1/2020 | Huber | B31F 1/2804 |
| 2020/0118262 | A1 * | 4/2020 | Takemoto | B31F 1/2813 |
| 2021/0060891 | A1 * | 3/2021 | Brivio | B31F 1/2813 |
| 2022/0080696 | A1 * | 3/2022 | Kiessner | B31F 1/285 |
| 2023/0405962 | A1 * | 12/2023 | Adami | B31F 1/2872 |
| 2024/0017516 | A1 * | 1/2024 | Imposti | B31F 1/2845 |
| 2024/0051253 | A1 * | 2/2024 | Nitta | B31F 1/2831 |

* cited by examiner

CORRUGATED CARDBOARD PRODUCTION PLANT WITH DOUBLE OUTPUT SIDE

CROSS-REFERENCE TO RELATED APPLICATIONS

The present application claims priority of Italian Patent Application No. 102021000030563, filed Dec. 2, 2021, the entire contents of which are incorporated by reference herein as if fully set forth.

FIELD OF THE INVENTION

The present invention relates to a plant for the production of corrugated cardboard.

BACKGROUND

The corrugated cardboard production plants which are known in the art comprise one of more corrugation units, each of which is supplied with continuous paper webs. Each corrugation unit comprises a corrugator, referred to as a "single facer", particularly suitable for creating corrugations on one of the continuous paper webs and joining the corrugated web to a continuous paper web, referred to as a "facing", thus forming a continuous composite cardboard sheet, referred to as a "canneté".

In particular, each single facer comprises a pair of corrugation rollers which are coupled together and define a corrugation channel. A continuous paper web is fed into the corrugation channel and is permanently deformed into a plurality of parallel and perpendicular corrugations arranged in succession in the direction of feeding of the web. At the output of the corrugation channel, an adhesive substance is applied to the corrugated web and the corrugated web is associated with a first facing. A presser element or unit arranged in the vicinity of the output of the corrugation channel presses against the first facing so as to favor adhesion together with the corrugated web.

The corrugated cardboard production plants furthermore comprise a plurality of processing stations which are arranged in sequence and receive the canneté formed by the corrugation unit and are able to finalize the production of the corrugated cardboard.

For example, plants which comprise one or more laminating units which form a corrugated cardboard sheet by combining, for example gluing together, one or more cannetés and a further continuous paper web, referred to as a "second facing", are known. Each corrugated cardboard sheet therefore comprises a first canneté on top of which one or more cannetés may be arranged, followed, lastly, by a second facing.

Plants comprising a double backer unit designed to stabilize the laminated assembly of continuous paper webs are known. For this purpose, the double backer unit may comprise heating plates and a belt or pressure rollers designed to heat and press the corrugated cardboard, respectively, in order to consolidate gluing together of the sheets which form it.

Also known are plants which may include printers, arranged upstream or downstream of the double backer units, for printing images and/or symbols on the paper webs or on the finished corrugated cardboard.

The plants of the known type usually also comprise processing stations in which the continuous cardboard formed in the other processing stations is finalized, for example creased and cut into single cardboard sheets, or stored in storage buffers, etc.

The plants of the known type have a longitudinal extension such as to form a production line in which the canneté made by the corrugation unit moves along a longitudinal direction, which represents the overall direction of movement of the paper webs through the plant and along a preferential direction which starts from the corrugation unit and passes through the various processing stations in sequence. According to this configuration, it may be stated that the plants of the known type comprise an input for the material to be processed, namely the reels of paper of the corrugation unit, and an output for the finished product, namely the last processing station of the production line. The single processing stations downstream of the single facer may be exchanged or increased or reduced in number, depending on the type of end product to be obtained.

Numerous tests carried out by the Proprietor have shown how the need to obtain different end products in the same plant results in long times for replacement and/or addition and setting-up of the individual processing stations. In some cases, the need to obtain different end products is such that, in terms of the manufacturing time and quantity of products, it is required to install a new production line, thereby duplicating the number of single facers and processing stations which make up the production line, as well as the personnel needed to monitor the production steps. Also, when adopting these measures, in some cases, the available space is not sufficient for the installation of a new plant.

In order to solve this problem, plants exist where there are several processing lines arranged in several horizontal planes one above the other, i.e. plants where one or more single facers are arranged in a first plane coinciding with the ground and one or more single facers are arranged in a second plane parallel to the first plane, for example a raised platform.

For example, JPH0454836U describes a plant composed of two complete processing lines arranged above one another. Each processing line is able to produce independently a single-corrugated cardboard sheet and, alternatively, the plant is able to produce a double-corrugated cardboard sheet making use of both the processing lines. This solution also does not solve completely the problem of the amount of space occupied and in particular creates new problems with regard to management of the production line arranged on a higher level, such as the difficulty for the operators to monitor the production sequence or the difficulty of lifting heavy and bulky reels of paper into a position situated several meters above the ground.

There has therefore arisen the need to overcome the aforementioned drawbacks of the prior art and to provide a corrugated cardboard production plant which is able to produce different types of corrugated carboard, which occupies a small volume in the form of a simple, practical and low-cost solution and which allows optimization of the number of resources.

The disclosure of this section is to provide background of the invention. Applicant notes that any mentioned publications speak for themselves and that all other information and characterizations are not admitted by Applicant to constitute prior art.

SUMMARY

These objects are achieved by the characteristic features of the invention illustrated in the independent claim. The dependent claims define preferred and/or particularly advantageous features of the invention.

In view of this object the Proprietor has devised, according to the invention, a corrugated cardboard production plant which comprises a corrugation unit, suitable for making a composite cardboard sheet and comprising a corrugator and a plurality of continuous paper web storing units, and a first processing station arranged downstream of said corrugation unit in sequence along a first direction of movement of the corrugated cardboard, the plant further comprising a second processing station arranged downstream of said corrugation unit in sequence along a second direction of movement of the composite cardboard different from the first direction of movement.

It is understood that elements and characteristics of one embodiment may be incorporated in other embodiments without further clarifications.

BRIEF DESCRIPTION OF THE DRAWINGS

Reference will now be made in detail to the various embodiments of the invention, with particular reference to the attached figures, in which.

DETAILED DESCRIPTION OF THE PREFERRED EMBODIMENTS

Each example is provided merely by way of illustration of the invention and is understood as not being a limitation thereof. For example, the technical characteristics shown or described since they form part of one embodiment may be integrated within, or associated with, other embodiments in order to produce a further embodiment. It is understood that the present invention will be inclusive of these modifications and variants.

A corrugated cardboard production plant, which is generally denoted by 1, comprises a first production line which is composed of a plurality of devices and/or processing stations and/or operating units arranged in succession and aligned along a longitudinal direction X, wherein the cardboard is moved along a first direction of movement F1 in said longitudinal direction X.

Figure 1:
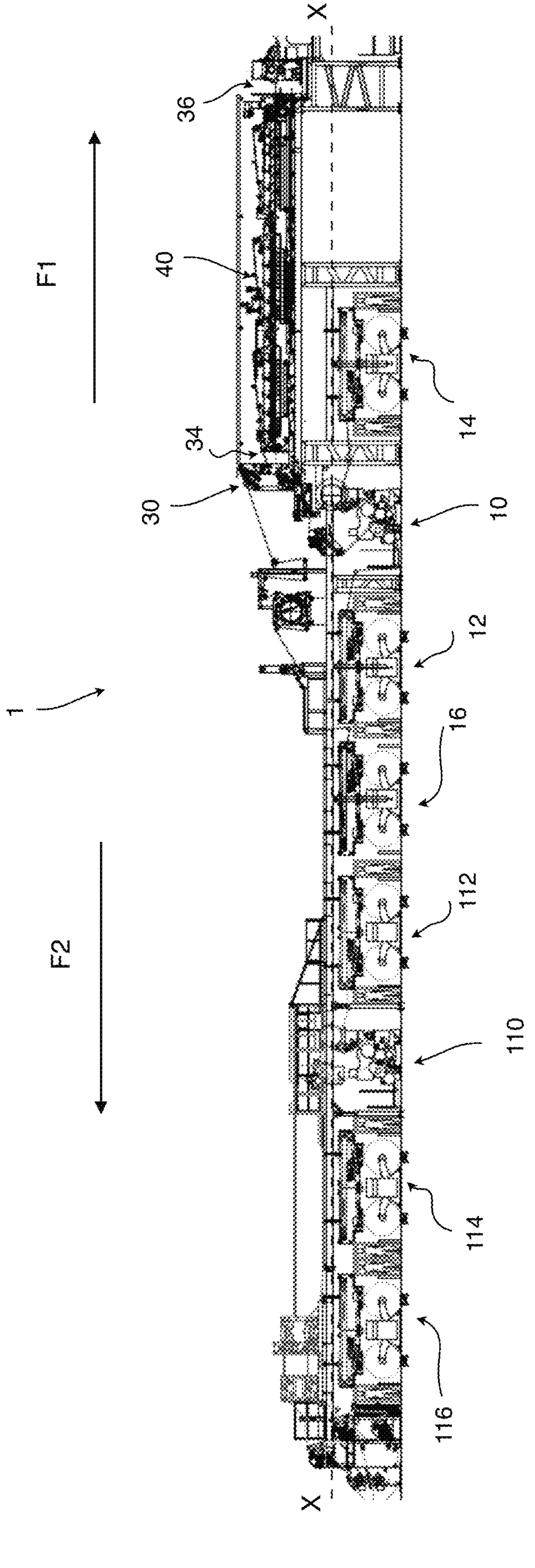
FIG. 1 is a partial view of a central portion of the plant according to the present invention.

With particular reference to FIG. 1, the production plant 1 comprises a corrugation unit 10, comprising a corrugator 20 and a plurality of continuous paper web storing units 12, 14, 16, and a plurality of processing stations, for example, a laminating unit 30 and a double backer unit 40.

A first storing unit 12, arranged upstream of the corrugator 20 along the first direction of movement F1 of the cardboard, comprises at least one reel support arm for supporting a reel of continuous paper web P0 particularly suitable for forming a corrugated web. A second storing unit 14, arranged downstream of the corrugator 20 along the first direction of movement F1 of the cardboard, comprises at least one reel support arm for supporting a reel of continuous paper web P1 particularly suitable for forming a first facing of the cardboard. A third storing unit 16, arranged upstream of the corrugator 20, along the first direction of movement F1 of the cardboard, comprises at least one reel support arm for supporting a reel of continuous paper web P2 particularly suitable for forming a second facing of the cardboard.

Figure 2:
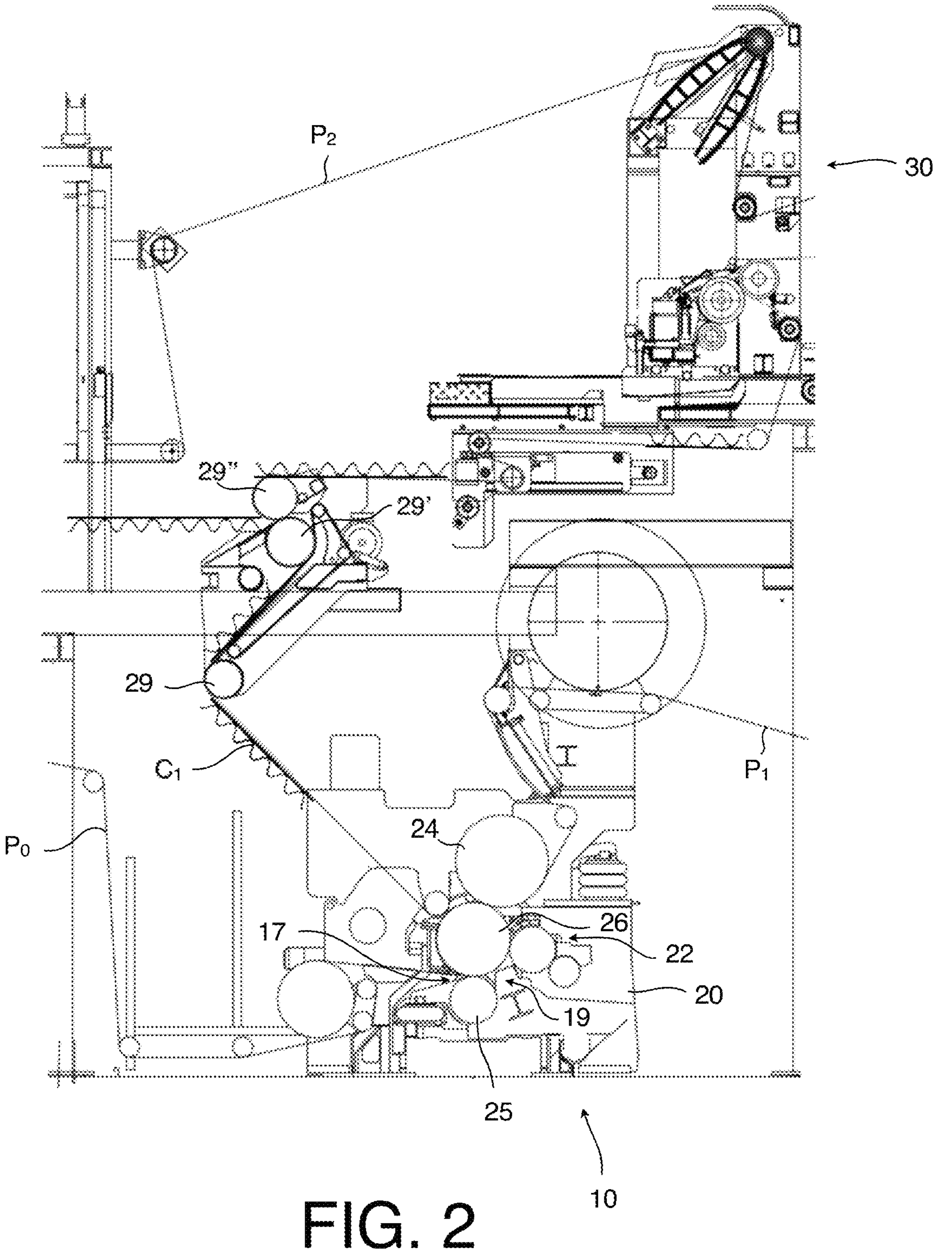
FIG. 2 is a view, on larger scale, of the corrugation unit according to FIG. 1.

The corrugator 20 is intended to form a canneté C1, namely a composite sheet composed of a corrugated sheet joined together with a corresponding flat sheet. With particular reference to FIG. 2, the corrugator 20 comprises a pair of corrugation rollers 25 and 26 which are coupled together and define a corrugation channel. According to the embodiment shown in the figures, an input 17 of the corrugation channel is arranged towards the processing stations upstream of the corrugator 20 along the first direction of movement F1 of the cardboard, and an output 19 of the corrugation channel is arranged towards the processing stations downstream of the corrugator 20 along the first direction of movement F1 of the cardboard.

The corrugator 20 furthermore comprises a gluing station 22 for applying a glue onto the crests of the corrugations formed on the canneté C1 which is joined together with the first facing, and a presser element 24 for favoring adhesion of the first facing to the corrugated web. The gluing station is arranged close to the output 19 of the corrugation channel.

According to this configuration, the canneté C1 output from the corrugator 20 comprises a plurality of corrugations arranged downwards. The production plant 1 also comprises one or more deviators, for example one or more deviation rollers 29, 29, 29" for deviating the canneté C1 in different directions of movement in such a way that the corrugations are arranged upwards before entering the double backer unit 40 in the first production line. The deviation rollers may be arranged upstream of the corrugator 20 along the first direction of movement F1 of the cardboard, namely arranged on the side of the corrugator 20 where the input 17 of the corrugation channel is present.

The production plant 1 also comprises a jockey roller 31, namely a device for controlling the tension of the canneté C1.

The corrugated cardboard production plant 1 comprises in the first production line a first processing station, for example, but not exclusively, the laminating unit 30, arranged adjacent to and downstream of the corrugation unit 10 with respect to the first direction of movement F1 of the corrugated cardboard.

Figure 3:
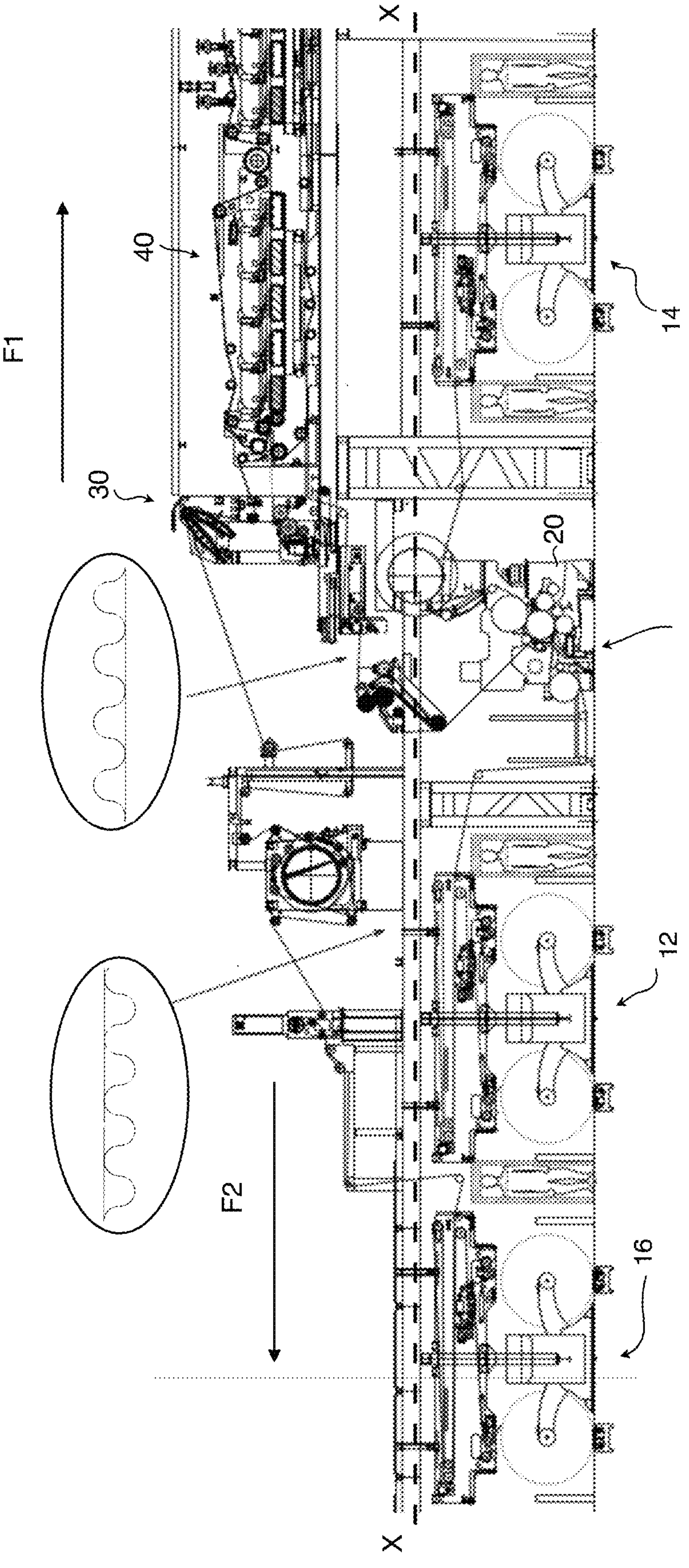
FIG. 3 is a view of a first production line of the plant according to FIG. 1.
Figure 4:
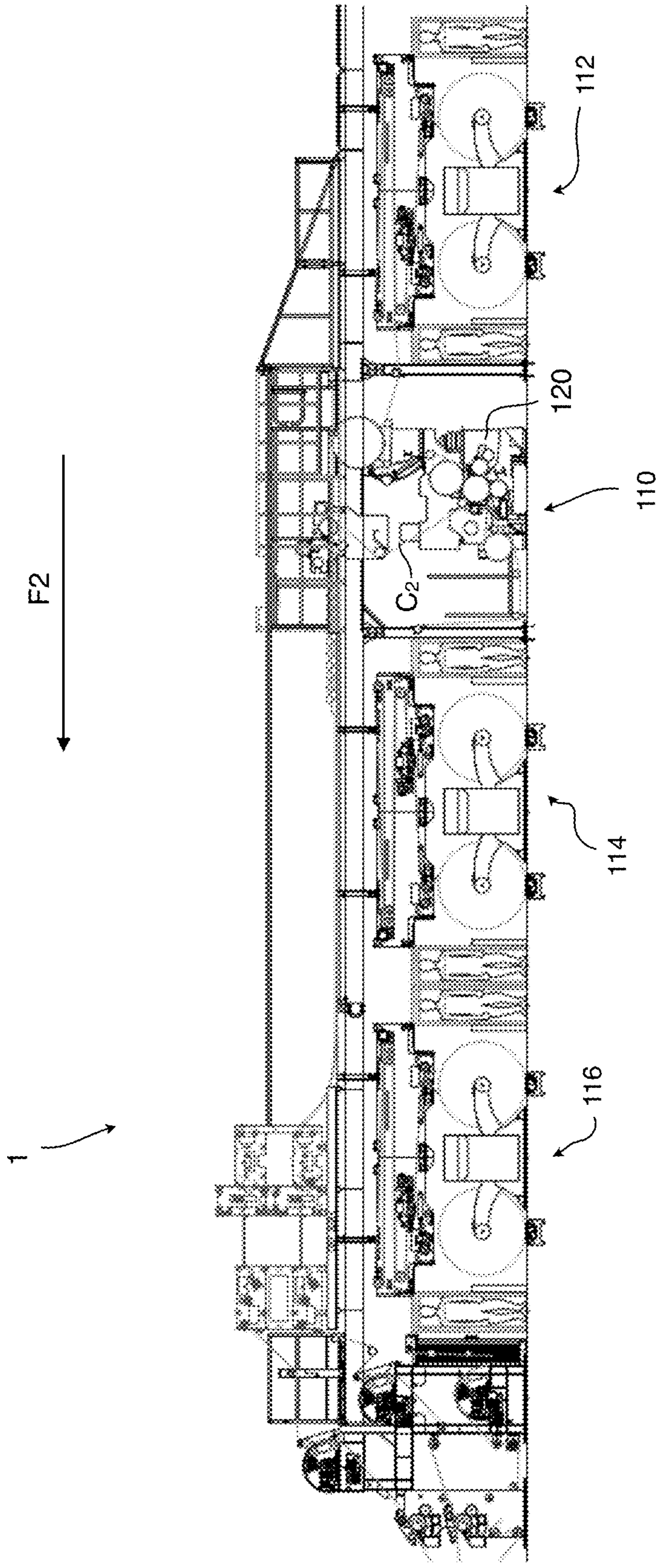
FIG. 4 is a view of a second production line of the plant according to FIG. 1.

The laminating unit 30 comprises a glue application device for applying a predetermined quantity of glue onto the canneté C1 which is supplied from the corrugator 20 and will be glued to the second facing P2 supplied from the third storing unit 16. The laminating unit 30 therefore assembles a corrugated cardboard sheet with a double facing by joining the canneté C1 to the second facing P2. As shown in the embodiment of FIGS. 2 and 3, the canneté C1 entering—namely situated upstream of—the laminating unit 30 is arranged so that the corrugations are directed upwards, and the second facing P0 entering the laminating unit 30 is arranged above the canneté C1.

A first double backer unit 40 is positioned, downstream of the laminating unit 30, along the first direction of movement F1 of the corrugated cardboard, and is designed to stabilize, or consolidate, the laminated assembly of the sheets forming the corrugated cardboard. For example, the double backer unit 40 comprises several double backer units. Each double backer unit comprises heating elements and presser elements for heating the corrugated cardboard to a predetermined temperature and for applying a predetermined pressure onto the corrugated cardboard, respectively. For example, each double backer unit may comprise one or bottom plates and one or more top shoes or belts.

Furthermore, the double backer unit 40 comprises a transfer unit (not shown in detail in the figures) designed to transport, or move, the corrugated cardboard through the double backer units from an input end 34 to an output end 36 of the double backer unit 40 along the first direction of movement F1 of the corrugated cardboard.

Figure 1A:
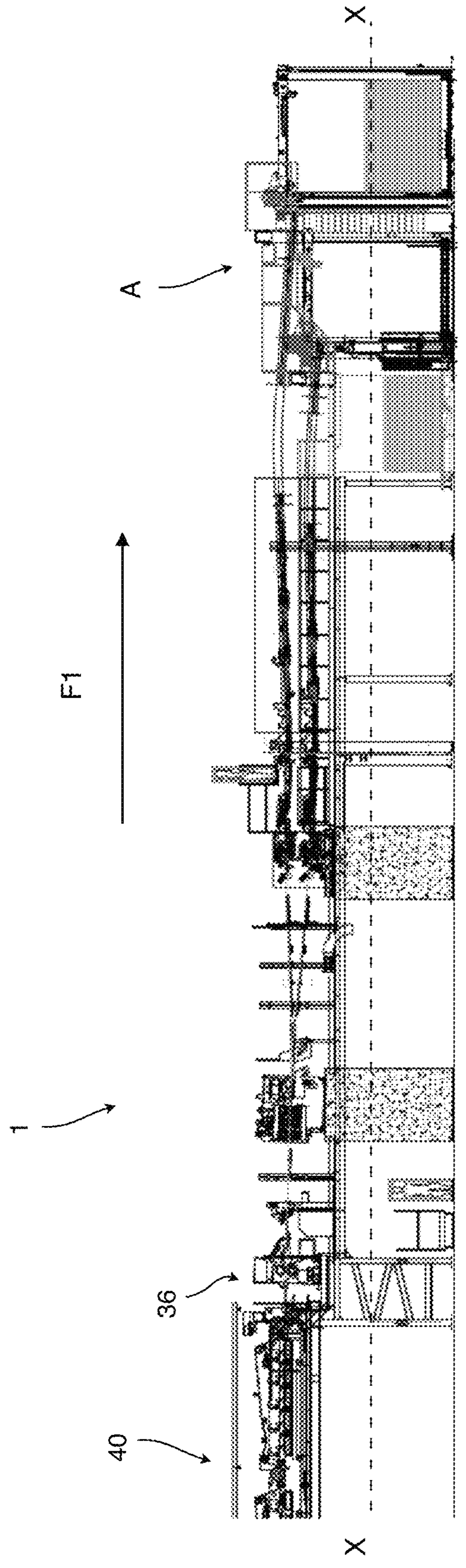
FIG. 1A is a partial view of a first end portion of the plant according to the present invention.

With particular reference to FIG. 1A, the plant 1 according to the present invention comprises, downstream of the double backer unit 40 along the first direction of movement F1 of the corrugated cardboard, a plurality of further operating stations which are particularly suitable for finalizing the corrugated cardboard. The plant therefore comprises a first output A for the corrugated cardboard which is produced by the first corrugation unit 10. The output is understood as being a position in the plant where the cardboard is no longer subject to any processing inside the plant 1 itself. For example, but not exclusively, the output A may correspond to the last operating station arranged in said longitudinal direction X along the first direction of movement F1 of the corrugated cardboard. By way of example, the last operating station could be a unit for storing punched corrugated cardboard.

In the solution provided in accordance with the embodiments of the present invention, the corrugated cardboard production plant 1 comprises a second production line composed of a plurality of devices and/or processing stations and/or operating units arranged in succession along the longitudinal direction X, where the cardboard is moved along a second direction of movement F2 along said longitudinal direction X.

In the embodiment shown in FIG. 1, the plant 1 comprises a further processing station, for example, but not exclusively, a second corrugation unit 110 arranged downstream of the first corrugation unit 10 with respect to the second direction of movement F2 of the corrugated cardboard. The second corrugation unit 110 may comprise a second corrugator 120 and the same technical characteristics described for the first corrugation unit 20 and shown in FIG. 2. Said description is not repeated for the sake of brevity, but is incorporated by way of reference.

Figure 1B:
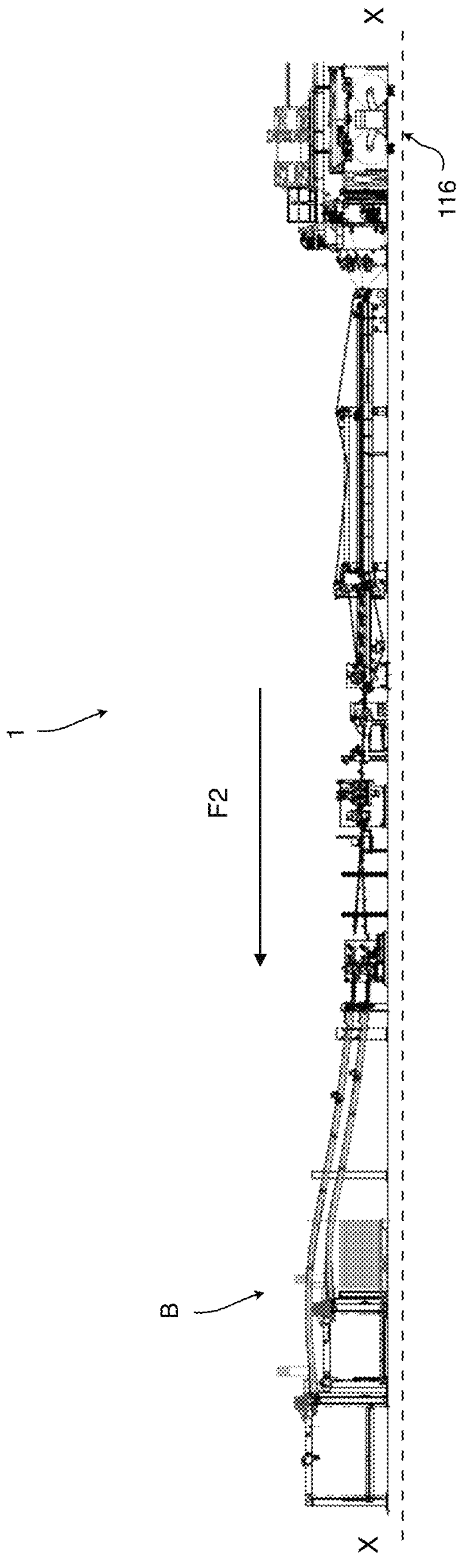
FIG. 1B is a partial view of a second end portion of the plant according to the present invention.

As clearly shown in FIGS. 1, 1A, 1B, the single facers 10, 110 of the two production lines are arranged along a same horizontal plane coinciding with the ground, namely with the floor of the premises in which they are installed.

Purely by way of a non-limiting example, the figures show a plant in which the plurality of devices and/or processing stations and/or operating units are arranged in succession along the same longitudinal direction and in which the first direction of movement F1 of the corrugated cardboard is to the right of the corrugation unit 10, while the second direction of movement F2 of the corrugated cardboard is set inwards to the left of the corrugation unit 10. Obviously, it is possible to envisage different longitudinal directions of movement of the paper webs through the plant so long as the first direction of movement is in a direction different from that of the second direction of movement.

The second production line further comprises: a first storing unit 112, which is arranged upstream of the corrugator 110 along the second direction of movement F2 of the cardboard and comprises at least one reel support arm for supporting a reel of continuous paper web which is particularly suitable for forming a first facing of a cardboard sheet; a second storing unit 114, which is arranged downstream of the corrugator 110 along the second direction of movement F2 of the cardboard and comprises at least one reel support arm for supporting a reel of continuous paper web which is particularly suitable for forming a corrugated web; a third storing unit 116, which is arranged downstream of the second corrugation unit 110, along the second direction of movement F2 of the cardboard, and comprises at least one reel support arm for supporting a reel of continuous paper web which is particularly suitable for forming a second facing of a cardboard sheet.

As clearly shown in FIGS. 1, 1A, 1B, the paper web storing units 112, 114, 116 and 12, 14, 16 of the two production lines are arranged along a same horizontal plane coinciding with the ground, namely with the floor of the premises in which they are installed.

The second corrugation unit 110 is intended to form a second canneté C2, namely a composite sheet composed of a corrugated sheet joined together with a corresponding flat sheet.

With particular reference to FIG. 1B, the plant 1 according to the present invention comprises, downstream of the second corrugation unit 110, along the second direction of movement F2 of the corrugated cardboard, a plurality of further operating stations which are particularly suitable for finalizing the corrugated cardboard. The plant therefore comprises a second output B for the corrugated cardboard which is produced by the second corrugation unit 110. The output is understood as being a position in the plant where the cardboard is no longer subject to any processing inside the plant 1 itself. For example, but not exclusively, the output B may correspond to the last operating station arranged in said longitudinal direction X along the second direction of movement F2 of the corrugated cardboard. By way of example, the last operating station could be a storage unit for storing corrugated cardboard.

According to this configuration, it is possible to state that the cardboard production plant 1 according to the present invention comprises an input for the material to be processed, namely the reels of the continuous paper web storing units 12, 14, 16, 112, 114, 116 and a double output for the corrugated cardboard, namely the last operating station of the first production line along the first direction of movement F1 and the last operating station of the second production line along the second direction of movement F2.

According to the embodiment shown in the figures, therefore, each production line, i.e. both the first line along the first direction of movement F1 and the second line along the second direction of movement F2, are able to each produce at least one canneté or a single-corrugated cardboard sheet simultaneously and to output them from a separate and respective output of the production plant 1.

In particular, the canneté C1 output from the corrugator 20 is moved into the laminator 30, joined together with the second facing P2 and then inserted into the double backer unit 40 so as to produce a single-corrugated cardboard sheet which is conveyed along the first production line towards a first output of the plant 1.

Even more particularly, the canneté C1 exits the corrugator 20 along the second direction of movement F2, passes over the first deviator 29 which reverses the direction of the canneté C1 along the first direction of movement F1 of the cardboard. Then the canneté C1 passes over the second deviator 29' which reverses the direction of the canneté C1 along the second direction of movement F2 of the cardboard. Then the canneté C1 passes over the third deviator 29" which reverses the direction of the canneté C1 again along the first direction of movement F1 of the cardboard such that the canneté C1 arrives at the first processing station arranged in the first direction of movement F1 of the corrugated cardboard with the corrugations directed upwards.

Similarly, the canneté C2 produced by the second corrugation unit 110 is moved along the second direction of movement F2 and joined together with a continuous paper web used as facing and stored on the reels of the storing unit 116 and then conveyed along the second production line towards a second output of the plant 1.

Alternatively, it is possible to provide a further production mode by moving the first cannetéC1 produced on the first corrugation unit 10 in second production line along the second direction of movement F2. According to this production mode, during use, the canneté C1 passes over the first deviator 29' which reverses the direction of the canneté C1 along the first direction of movement F1 of the cardboard. Then the canneté C1 passes over the second deviator 29" which reverses the direction of the canneté C1 along the second direction of movement F2 of the cardboard such that the canneté C1 arrives at the first processing station arranged along the second production line in the second direction of movement F2 of the corrugated cardboard with the corrugations directed downwards.

According to this production mode, the canneté C1 is transported to the operating stations arranged along the second direction of movement F2 so as to be joined to the second facing present in the third storing unit 116 forming a single-corrugated cardboard sheet exiting the output B.

Figure 5:
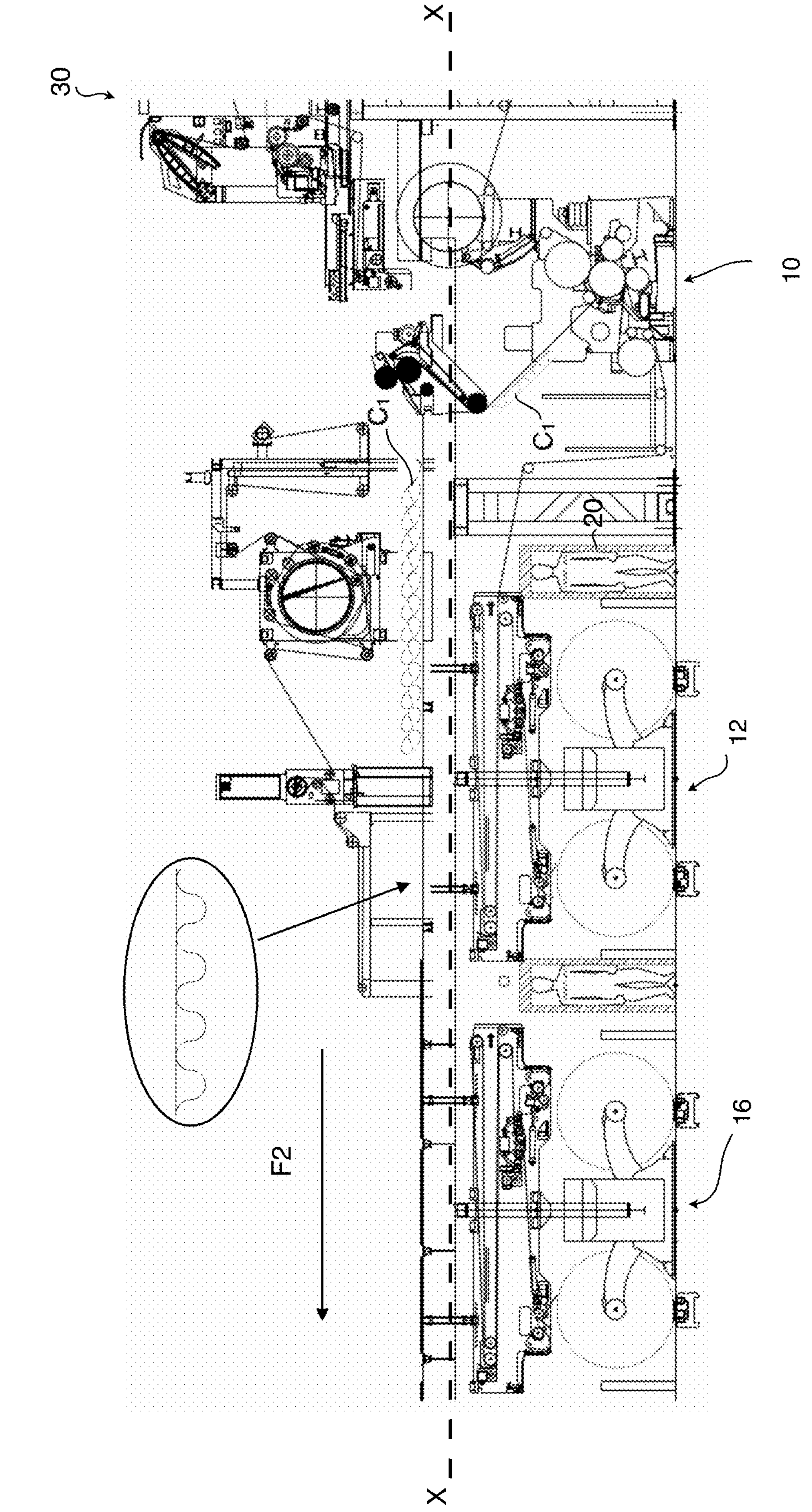
FIG. 5 is a partial view of the plant according to the present invention in one of the possible production modes.

Alternatively, the canneté C1 is joined together with the second canneté C2 produced on the second corrugation unit 110, in order to form a double-corrugated cardboard sheet moved within the plant 1 along the second direction of movement F2. In this case, as shown in FIG. 5, the first canneté C1 is arranged so that the corrugations are arranged downwards.

The plant as described above is therefore able to produce rapidly different corrugated cardboard end products without the need to modify, integrate or replace the production line components.

In fact, as can be understood from the description provided hitherto and from the illustration in the attached figures, the plant according to the present invention is able to transport a canneté with the corrugations arranged upwards to the processing stations arranged in the production line along the first direction of movement F1 and, alternatively, a canneté with the corrugations arranged downwards to the processing stations arranged in the second production line along the second direction of movement F2. As a result, it is possible to produce, with a single plant, two single-corrugated cardboard sheets with different characteristics. For example, a single-corrugated cardboard sheet with printed facing or with predetermined (more delicate or higher quality) technical characteristics may be transported to the output A, since the facing is applied to canneté from above without being subject to the thermal and humidity stress of the intermediate processing stations. Differently, a single-corrugated sheet with different predetermined technical characteristics may be transported to the output B since the facing is applied to the canneté from below.

According to further embodiments of the present invention, not shown, the plant 1 comprises a first group of single operating stations, for example a corrugation unit and a laminator, a second group of further processing stations arranged downstream of the first group along a first direction of movement F1 of the cardboard, and a third group of further processing stations arranged downstream of the first group along a second direction of movement F2 of the cardboard having a direction different from that of the first direction of movement.

The invention claimed is:

1. A corrugated cardboard production plant with double output side comprises:

a corrugation unit (10) configured to make a composite cardboard sheet (C1), said corrugation unit (10) comprising a corrugator (20) and a plurality of continuous paper web storing units (12, 14, 16);

a first processing station (30, 40) arranged downstream of said corrugation unit (10) along a first direction of movement (F1) of the composite cardboard sheet; and a second corrugation unit (110) arranged downstream of said corrugation unit (10) along a second direction of movement (F2) of the composite cardboard sheet, the second direction of movement (F2) being an opposite horizontal direction as the first direction of movement (F1), and the corrugation unit and the second corrugation unit being arranged on a same horizontal level of the corrugated cardboard production plant.

2. The corrugated cardboard production plant according to claim 1, wherein one of the continuous paper web storing units (16) is arranged downstream of said corrugation unit (10) along the second direction of movement (F2) of the composite cardboard sheet.

3. The corrugated cardboard production plant according to claim 2, wherein the composite cardboard sheet (C1) comprises a plurality of corrugations, the corrugation unit (10) comprises one or more deviation rollers (29) for deviating the composite cardboard sheet (C1) so that the corrugations are arranged upwards before entering the first processing station (30, 40).

4. The corrugated cardboard production plant according to claim 1, wherein the second corrugation unit (110) is configured to form a second composite cardboard sheet (C2), said second corrugation unit (110) comprising a corrugator (120) and a plurality of continuous paper web storing units (112, 114, 116).

5. The corrugated cardboard production plant according to claim 4, wherein a continuous paper web storing unit (112) is arranged upstream of the second corrugation unit (110) along the second direction of movement (F2).

6. The corrugated cardboard production plant according to claim 4, wherein:

the corrugation unit (10), the first processing station (30, 40), and the second corrugation unit (110) are arranged along a longitudinal direction X;

the corrugation unit (10) and the first processing station (30, 40) are arranged in succession along the first direction of movement (F1); and the corrugation unit (10) and the second corrugation unit (110) are arranged in succession along the second direction of movement (F2).

7. The corrugated cardboard production plant according to claim 1, wherein the plant is capable of producing either: two single-corrugated cardboard sheets simultaneously or a double-corrugated cardboard sheet.

8. The corrugated cardboard production plant according to claim 1, wherein the plant simultaneously produces two single-corrugated cardboard sheets, each moved along a different direction of movement (F1, F2).

9. The corrugated cardboard production plant according to claim 1, wherein the corrugation unit (10) and the second corrugation unit (110) are aligned in a same horizontal plane.

10. The corrugated cardboard production plant according to claim 1, further comprising a laminating unit comprising a glue application device for applying a predetermined quantity of glue onto the composite cardboard sheet, the laminating unit being downstream of the corrugation unit (10) with respect to the first direction of movement (F1) of the composite cardboard sheet.

11. The corrugated cardboard production plant according to claim 1, further comprising a second corrugation unit (110) arranged downstream of the first corrugation unit (10) along the second direction of movement (F2) of the composite cardboard sheet.

12. A corrugated cardboard production plant with double output side comprises:

a corrugation unit (10) configured to make a composite cardboard sheet (C1), said corrugation unit (10) comprising a corrugator (20) and a plurality of continuous paper web storing units (12, 14, 16);

a first processing station (30, 40) arranged downstream of said corrugation unit (10) along a first direction of movement (F1) of the composite cardboard sheet; and a second corrugation unit (110) arranged downstream of said corrugation unit (10) along a second direction of movement (F2) of the composite cardboard sheet, and wherein the second corrugation unit (110) is aligned in a same horizontal plane as the corrugation unit (10), with the horizontal plane being parallel to a ground or supporting surface.

13. The corrugated cardboard production plant according to claim 12, wherein the second direction of movement (F2) is an opposite horizontal direction as the first direction of movement (F1).

14. The corrugated cardboard production plant according to claim 12, further comprising a laminating unit comprising a glue application device for applying a predetermined quantity of glue onto the composite cardboard sheet, the laminating unit being downstream of the corrugation unit (10) with respect to the first direction of movement (F1) of the composite cardboard sheet.

15. The corrugated cardboard production plant according to claim 12, further comprising a second corrugation unit (110) arranged downstream of the first corrugation unit (10) along the second direction of movement (F2) of the composite cardboard sheet.

16. A corrugated cardboard production plant with double output side comprises:

a corrugation unit (10) configured to make a composite cardboard sheet (C1), said corrugation unit (10) comprising a corrugator (20) and a plurality of continuous paper web storing units (12, 14, 16);

a first processing station (30, 40) arranged downstream of said corrugation unit (10) along a first direction of movement (F1) of the composite cardboard sheet;

a second corrugation unit (110) arranged downstream of said corrugation unit (10) along a second direction of movement (F2) of the composite cardboard sheet, the second direction of movement (F2) being an opposite horizontal direction as the first direction of movement (F1); and a laminating unit comprising a glue application device for applying a predetermined quantity of glue onto the composite cardboard sheet, the laminating unit being downstream of the corrugation unit (10) with respect to the first direction of movement (F1) of the composite cardboard sheet.

17. The corrugated cardboard production plant according to claim 16, further comprising a second corrugation unit (110) arranged downstream of the first corrugation unit (10) along the second direction of movement (F2) of the composite cardboard sheet.

18. The corrugated cardboard production plant according to claim 16, wherein the corrugation unit and the second corrugation unit being arranged on a same horizontal level of the corrugated cardboard production plant.

* * * * *